(No Model.)

W. J. LANIGAN.
BICYCLE TIRE.

No. 597,777. Patented Jan. 25, 1898.

Witnesses
Victor J. Evans.
James F. Duhamel.

Inventor,
William J. Lanigan
by John Wedderburn
Attorney

United States Patent Office.

WILLIAM J. LANIGAN, OF DULUTH, MINNESOTA.

BICYCLE-TIRE.

SPECIFICATION forming part of Letters Patent No. 597,777, dated January 25, 1898.

Application filed January 12, 1897. Serial No. 618,911. (No model.)

*To all whom it may concern:*

Be it known that I, WILLIAM J. LANIGAN, a citizen of the United States, residing at Duluth, in the county of St. Louis and State of Minnesota, have invented certain new and useful Improvements in Bicycle-Tires; and I do hereby declare the following to be a full, clear, and exact description of the invention, such as will enable others skilled in the art to which it appertains to make and use the same.

This invention relates to improvements in tires, and has more particular relation to pneumatic tires.

The invention consists of the combination, with an endless inflatable tube, of a plurality of valved partitions mounted in said tube, so as to form a plurality of independent cells therein.

The invention also consists of certain other novel constructions, combinations, and arrangements of parts, all of which will be hereinafter more particularly set forth and claimed.

Figure 1:
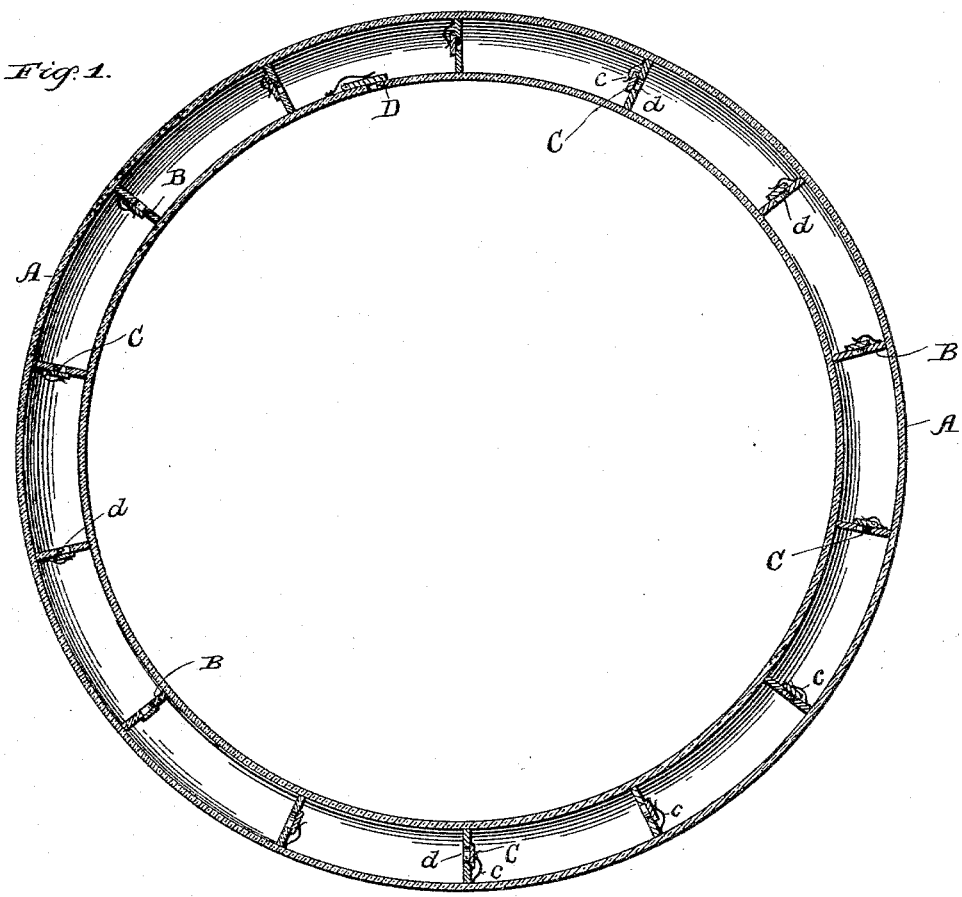
Figure 2:
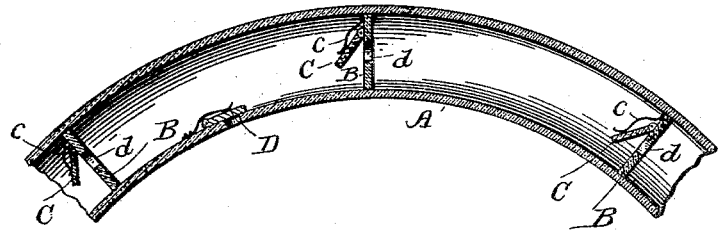

In the accompanying drawings, forming part of this specification, Figure 1 represents a central vertical section through a tire embodying my invention, and Fig. 2 represents an enlarged detail perspective view of one of the valved partitions.

A in the drawings represents the tire proper; B, the partitions; C, the valves mounted thereon, and D the main inflating-valve. Said tire A may be made of any desired construction and material and is provided with a plurality of radiating partitions B. These partitions are preferably secured in the tire after the same is molded. Each of said partitions is provided with an aperture $d$, covered by a suitable flap-valve C. One of the chambers formed by said partitions B is provided with an inflating-valve D, of any well-known construction.

It will be observed from the foregoing description that when air is forced into the valve D it passes from the chamber communicating with the same into the chamber to the left, opening the valve by its pressure. The air thus passes along through the entire tire to the left until all of the cells or chambers are filled equally. Each of the valves C is connected to its respective partition B by a spring $c$. The office of these springs is to normally hold the valves closed under ordinary pressure.

It will be observed from the foregoing that when the tire is first inflated the air pumped in through the valve D must be compressed in the first chamber until it rises above the normal pressure desired, when the first valve to the left will open and permit the air to escape to the second chamber to the left. The pressure in the first and second chambers must again be raised above the normal, so as to permit the second valve to the left to open and the air to escape into the third chamber, and so on through the entire series until all of the chambers are filled. Should one of the chambers be punctured, the compressed air in the same will immediately escape, but all of the valves will remain closed, as the pressure within the remaining chambers will not be sufficient to open the same, or if it were sufficient would only permit enough air to escape to reduce the pressure to the normal, when they would automatically close. The tire could thus be used until such time as the same could be conveniently repaired.

By the employment of this invention for bicycles there need be no fear of receiving a puncture when many miles from any place where repairs could be made, as the withdrawal of air from two or three of the chambers between the partitions would not in any wise affect the remaining chambers, and the wheel would not be rendered useless.

Having thus described my invention, what I claim as new, and desire to secure by Letters Patent, is—

1. A pneumatic tire comprising a single tube having an inflating-valve, a plurality of radiating partitions mounted in said tube for dividing the same into a number of communicating compartments, and self-closing valves mounted on said partitions and adapted to close the communicating passages therein, substantially as described.

2. A pneumatic tire comprising a resilient single tube having an inflating-valve, a plurality of radiating partitions mounted in said tube for dividing the same into a number of communicating compartments, spring-pressed valves mounted on said partitions and adapted to close the communicating passages therein, substantially as described.

In testimony whereof I have signed this specification in the presence of two subscribing witnesses.

WILLIAM J. LANIGAN.

Witnesses:
JAMES L. WANERD,
FRANK CUTTING.